(12) United States Patent
DeVries et al.

(10) Patent No.: US 8,305,028 B2
(45) Date of Patent: Nov. 6, 2012

(54) ELECTRIC MOTOR AND SWITCH FOR ELECTRIC MOTOR HAVING ARC BARRIER

(75) Inventors: Wayne J. DeVries, Benld, IL (US); Craig E. Wallace, Brighton, IL (US); Donald E. Morgan, Florissant, MO (US)

(73) Assignee: Nidec Motor Corporation, St. Louis, MO (US)

( * ) Notice: Subject to any disclaimer, the term of this patent is extended or adjusted under 35 U.S.C. 154(b) by 403 days.

(21) Appl. No.: 12/720,418

(22) Filed: Mar. 9, 2010

(65) Prior Publication Data

US 2011/0221381 A1    Sep. 15, 2011

(51) Int. Cl.
*H02P 1/42*    (2006.01)
*H01H 9/30*    (2006.01)

(52) U.S. Cl. .................. 318/793; 310/68 E; 318/558

(58) Field of Classification Search ............... 318/430, 318/431, 538, 778, 785, 789, 793, 558; 310/68 E
See application file for complete search history.

(56) References Cited

U.S. PATENT DOCUMENTS

| | | | | |
|---|---|---|---|---|
| 1,338,825 A | * | 5/1920 | Frank et al. ................. | 200/3 |
| 2,666,114 A | | 1/1954 | Jackson | |
| 2,697,151 A | | 12/1954 | Jackson | |
| 2,768,260 A | * | 10/1956 | Greenhut ................ | 200/80 R |
| 2,806,920 A | | 9/1957 | Jones | |
| 3,854,068 A | | 12/1974 | Rich | |
| 3,959,616 A | | 5/1976 | Swanson | |
| 4,205,245 A | * | 5/1980 | Hildebrandt et al. ....... | 310/68 E |
| 4,240,001 A | * | 12/1980 | Hildebrandt et al. ....... | 310/68 E |
| 4,296,366 A | * | 10/1981 | Hildebrandt et al. ........ | 318/793 |
| 4,525,694 A | | 6/1985 | Dennison | |
| 4,665,286 A | * | 5/1987 | Hansen ................... | 200/80 R |
| 5,463,199 A | | 10/1995 | Divincenzo | |
| 6,737,599 B1 | * | 5/2004 | Lewis .................... | 200/557 |

FOREIGN PATENT DOCUMENTS

| | | |
|---|---|---|
| GB | 318559 A | 9/1929 |
| GB | 718984 A | 11/1954 |
| GB | 728708 A | 4/1955 |
| GB | 2259810 A | 3/1993 |

OTHER PUBLICATIONS

Drawing, Admitted prior art, 1 page, unknown source, Date: Mar. 2010.

* cited by examiner

*Primary Examiner* — Bentsu Ro
(74) *Attorney, Agent, or Firm* — Senniger Powers LLP

(57) ABSTRACT

A switch for an electric motor has a switch arm comprising a lever and an arc barrier formed integrally with the lever. The switch has first and second electrical contacts. The switch arm and second electrical contact are moveable relative to the first contact between an open position and a closed position. The arc barrier is positioned adjacent the first contact in the closed position. The arc barrier limits the risk of electrical arcing associated with the electrical contacts. The switch is suitable for use in an electric induction motor. For example, the switch can be adapted to de-energize auxiliary start windings when an electric induction motor is up to speed and/or to provide a signal indicating the motor is operating.

13 Claims, 10 Drawing Sheets

ELECTRIC MOTOR AND SWITCH FOR ELECTRIC MOTOR HAVING ARC BARRIER

FIELD OF INVENTION

The present invention relates generally to an electric motor having an internal switch, and more particularly to an electric induction motor having an internal switch adapted to de-energize start windings after the motor has reached a threshold speed.

BACKGROUND

Electric induction motors are suitable for various applications because of their durable construction. The rotor of an induction motor is not wired directly to any current supply. Instead, a secondary current is induced in the rotor windings by a rotating magnetic field generated by the stator windings. Because the rotor windings are energized by a magnetic field, electric induction motors do not require any brushes to connect the rotor to a power source. The absence of brushes is desirable because brushes for electric motors can wear out and/or require maintenance.

Some electric induction motors have start windings on the stator that are energized along with the main stator windings during motor startup to help get the rotor up to operating speed. Once the motor is at speed, the start windings are de-energized because the motor operates more efficiently at full speed using only the main windings. This is commonly accomplished with an internal switch actuated by a centrifugal actuator. As generally known to those skilled in the art, a centrifugal actuator is connected to the rotor so it rotates with the rotor. After the rotor reaches a threshold speed, centrifugal forces cause weights in the actuator to move in a manner that produces axial movement of the actuator. The movement of the actuator results in movement of a switch arm to disconnect the start windings from the power supply. The switch is typically mounted close to the rotor to facilitate actuation of the switch by the centrifugal actuator on the rotor. The combination of switch and centrifugal actuator is sometimes referred to as a centrifugal switch.

The proximity of the switch to the rotor and other components creates the potential for electrical arcing between the switch and other components of the motor. For example, the switch can be mounted on the end shield of the motor close to a bearing hub for the output shaft of the rotor assembly presenting a potential for electrical arcing between the switch and the shaft or bearing hub. Electrical arcing is undesirable because it can cause structural and electrical damage to the components of the motor. Electrical arcing can also interrupt operation of the motor by blowing fuses and/or tripping circuit breakers. Thus, it is common to provide electrical insulation between the switch contacts and other components of the motor to limit or prevent arcing. For example, after the switch is mounted during assembly of the motor, fish paper or another suitable insulating material can be placed between the switch contacts and other parts of the motor to form a barrier to limit the potential for arcing. Other options used in prior art motors are to enclose the switch in an electrically insulating box or enclose the switch contacts in a boot made of an insulating material. There have also been designs in which plastic barriers are provided on the terminal board to limit arcing. Each of these options has added costs. Further, it is possible that the insulation provided to limit arcing associated with the switch may become dislodged or may be inadvertently omitted during assembly. This would not be apparent because the motor would continue to operate normally, at least until there was an unexpected arcing incident.

SUMMARY

In one aspect, the present invention includes a start winding switch for an electric induction motor. The switch comprises a terminal board comprising an electrically non-conductive material and having an edge margin. The switch also comprises a first electrical contact mounted on the terminal board and a switch arm moveably connected to the terminal board for movement with respect to the board. The switch arm comprises a lever extending laterally beyond the edge margin of the board and an electrical arc barrier extending from the lever. In addition, the switch includes a second electrical contact connected to the switch arm. The switch arm and the second contact are moveable simultaneously relative to the terminal board and the first contact between an open position, in which an electrical resistance between the first and second contacts is relatively higher, and a closed position, in which the electrical resistance between the first and second contacts is relatively lower and the barrier is positioned adjacent the edge margin of the board and the second contact.

In another aspect, the present invention includes an electric motor comprising a stator, an end shield secured to the stator, and a rotor mounted for rotation relative to the stator. Further, the motor comprises a shaft connected to the rotor for rotation with the rotor, a bearing hub supported by the end shield and supporting the shaft for rotation relative to the end shield, and windings operable to produce rotation of the rotor relative to the stator when the windings are connected to a power supply. The motor also includes a switch comprising first and second electrical contacts and a switch arm. The switch arm comprises a lever operable to move the contacts relative to one another between an open position, in which an electrical resistance between the first and second contacts is relatively higher, and a closed position, in which the electrical resistance between the first and second contacts is relatively lower. The switch also includes an arc barrier formed integrally with the lever. The arc barrier is positioned generally between the first and second contacts and at least one of the shaft and the bearing hub when the first and second contacts are in the closed position.

In another aspect, a start winding switch for an electric induction motor has first electrical contact. The switch has a switch arm comprising a lever and an arc barrier formed integrally with the lever. A second electrical contact is connected to the switch arm. The switch arm and second electrical contact are moveable relative to the first contact between an open position, in which an electrical resistance between the first and second contacts is relatively higher, and a closed position, in which the electrical resistance between the first and second contacts is relatively lower and the barrier is positioned adjacent the first and second contacts.

Other objects and features will in part be apparent and will in part be pointed out hereinafter.

BRIEF DESCRIPTION OF THE DRAWINGS

Corresponding reference numbers indicate corresponding parts throughout the drawings.

DETAILED DESCRIPTION

Figure 1:
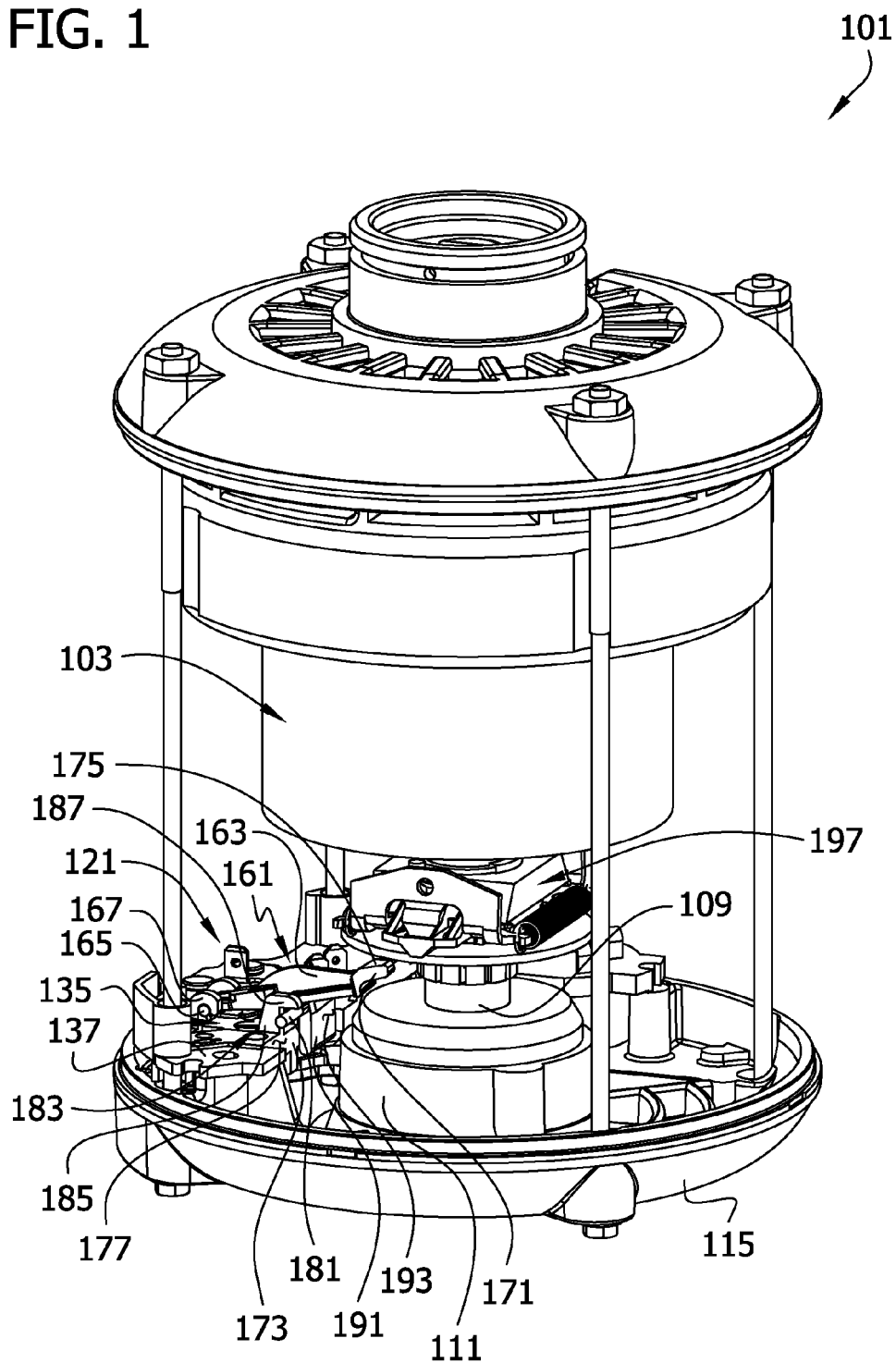
FIG. 1 is a perspective of one embodiment of a electric motor having parts removed to show internal features.

Referring to drawings, one embodiment of an electric motor, generally designated 101, is illustrated in FIGS. 1-10. Although the type of motor can vary, the motor 101 illustrated herein is an induction motor (e.g., a single speed induction motor). The motor 101 has a rotor (not shown) mounted inside a stator 103 for rotation relative to the stator. The rotor is connected to a shaft 109 so rotation of the rotor produces rotation of the shaft. The shaft 109 is received in a bearing hub 111 secured to an end shield 115 of the motor 101. The bearing hub 111 includes one or more bearings supporting the shaft 109 for rotation relative to the end shield 115 and stator 103.

A start winding switch 121 is secured to the end shield 115 adjacent the bearing hub 111. The switch 121 includes two electrical contacts 123, 125 supported by a terminal board 135, which includes a platform 137 having a generally planar upper surface. (As used herein, terms indicating a direction or orientation such as "up", "upper", "down", "lower", and the like are used in reference to the orientation of the motor as depicted in the drawings. It is understood that the orientation of the motor and components can vary within the scope of the present invention.) The electrical contacts 123, 125 are suitably coined or otherwise hardened metal pieces moveable relative to one another between an open position (FIGS. 2-4) in which the electrical contacts are spaced from one another by a gap 129 and a closed position (FIGS. 5-6) in which the electrical contacts are in physical contact with one another, creating a lower relative electrical resistance.

Figure 2:
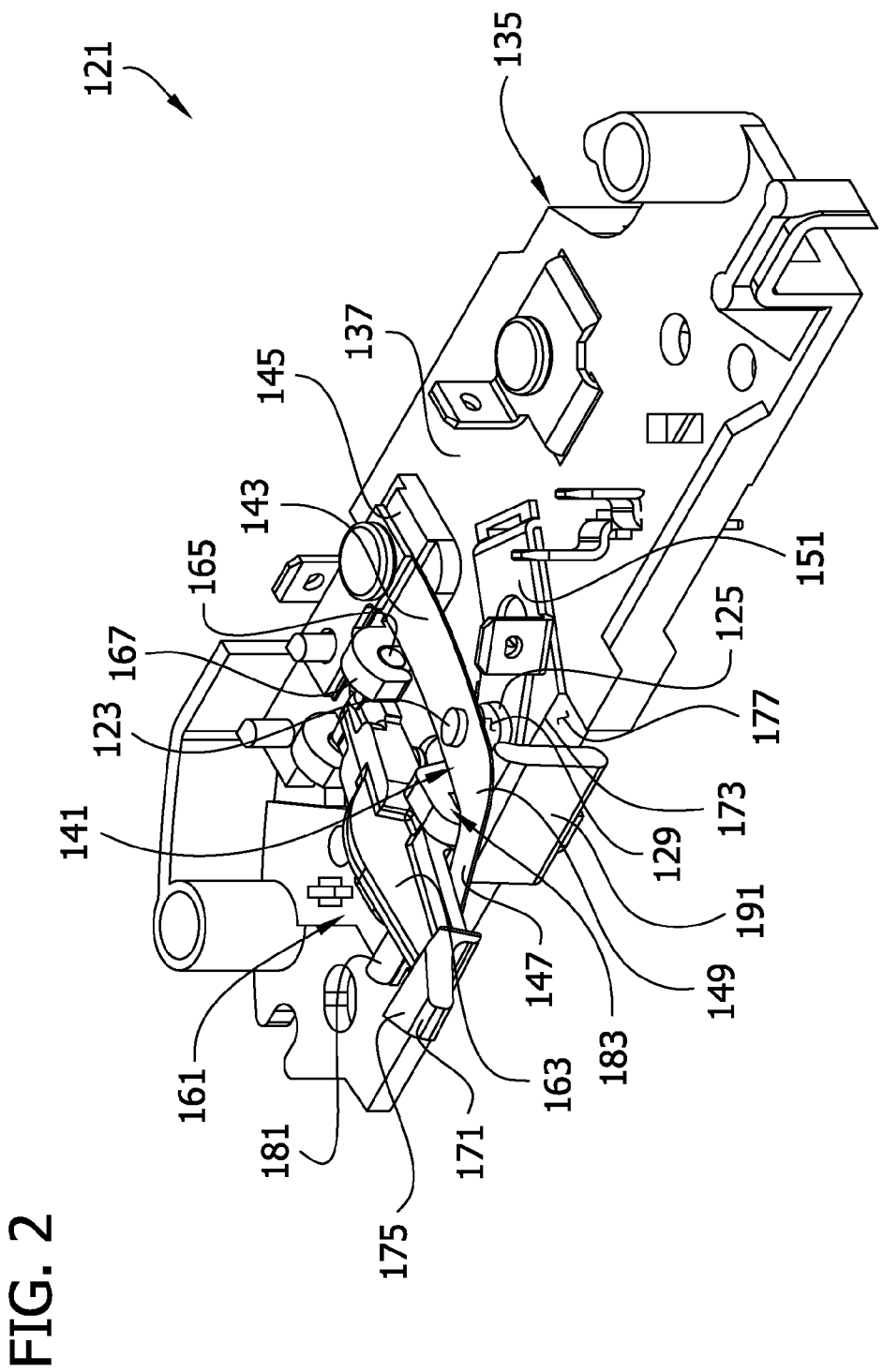
FIG. 2 is a perspective of a start winding switch of the motor showing the switch in the open position.

As illustrated in FIGS. 2-7, one of the contacts 123 is mounted on and in electrical contact with an electrically conductive (e.g., metal) spring plate 141. The spring plate 141 includes a relatively straight primary segment 143 supported at one end by a plateau 145 elevated above the platform 137 of the terminal board 135. An end segment 147 of the spring plate 141 is connected to the primary segment 143 opposite the plateau 145. The end segment 147 of the spring plate 141 is a relatively straight segment disposed at an angle relative to the primary segment 143 to result in a bend 149 in the spring plate at the intersection of the primary segment and end segment. The spring plate 141 can be manufactured to have the bend 149 using a suitable die to cut the spring plate 141 from a sheet of metal without actually bending or otherwise deforming the spring plate to produce the bend. In its undeformed state, the spring plate 141 has some curvature so it extends farther away from the terminal board platform 137 as it extends away from the plateau 145, e.g., as illustrated in FIG. 2. It is understood the spring plate 141 may be in its undeformed state when the switch 121 is in the open position or a preload may be applied to the spring plate 141 so the spring plate is deformed in the open position within the scope of the invention.

Figure 4:
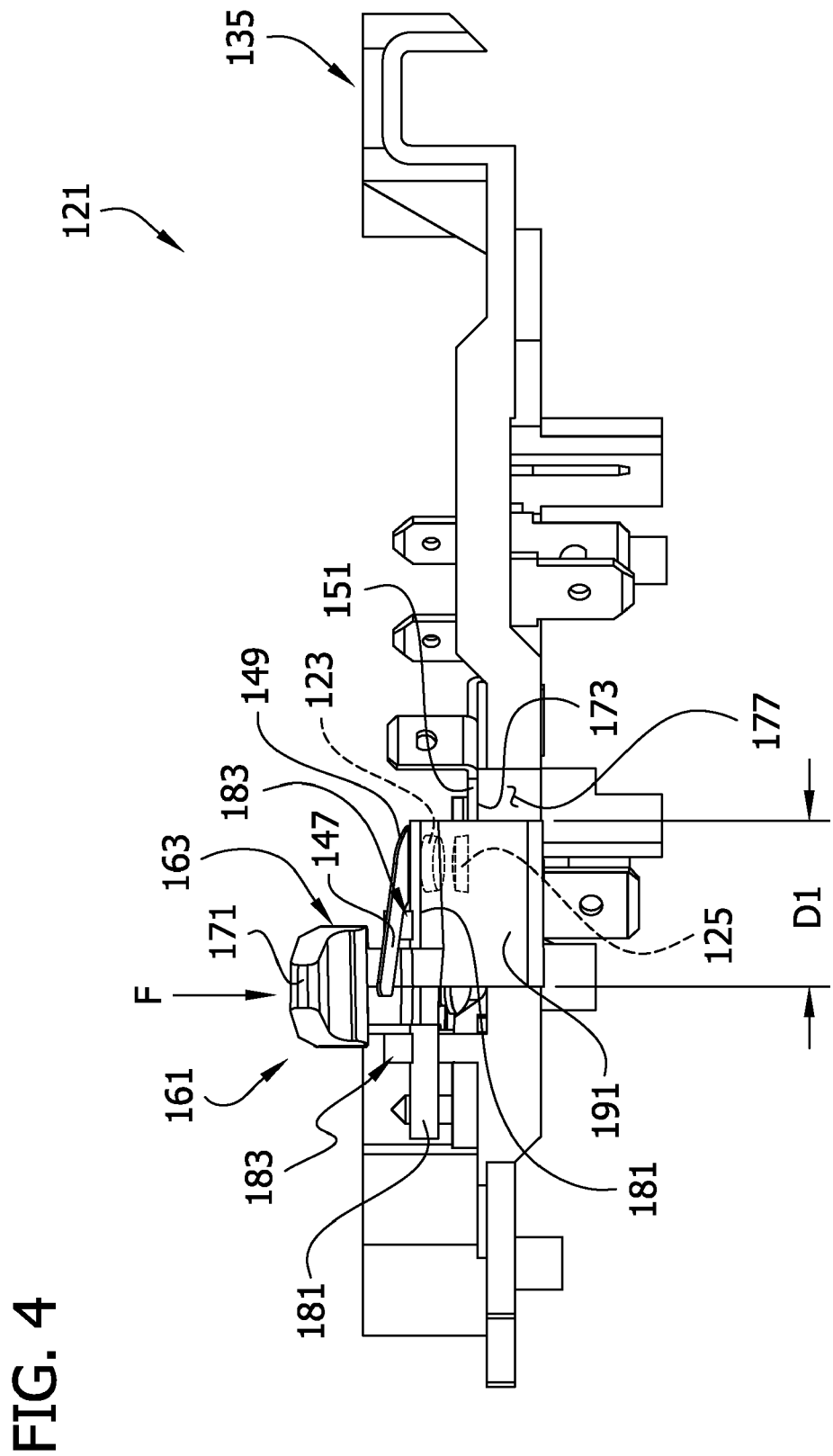
FIG. 4 is a front elevation of the switch.

The electrical contact 123 is mounted on the primary segment 143 of the spring plate 141 between the bend 149 and the plateau 145. The electrical contact 123 is suitably spaced from the plateau 145. As illustrated in FIG. 4, for instance, the contact 123 is mounted on the primary segment 143 of the spring plate 141 closer to the bend 149 than it is to the plateau 145. The other contact 125 is suitably fixed to the upper surface of the platform 137 of the terminal board 135 under the spring plate 141. For example, as illustrated in FIGS. 2 and 4, the contact 125 is suitably mounted on and in electrical contact with a metal plate 151 secured to and extending along a portion of the upper surface of the terminal board platform 137. The contact 125 on the upper surface of the platform 137 is suitably mounted directly under the electrical contact 123 mounted on the spring 141.

The spring plate 141 is biased to move the contact 123 mounted on it away from the contact 125 on the upper surface of the platform 137 toward the open position. It will be recognized that there is normally no electrically conductive path for flow of electrical current between the contacts 123, 125 because of the gap 129. Thus, there is normally substantially no electrical current flow between the contacts 123, 125 when the switch is in the open position due to the relatively high electrical resistance of the gap 129.

Figure 5:
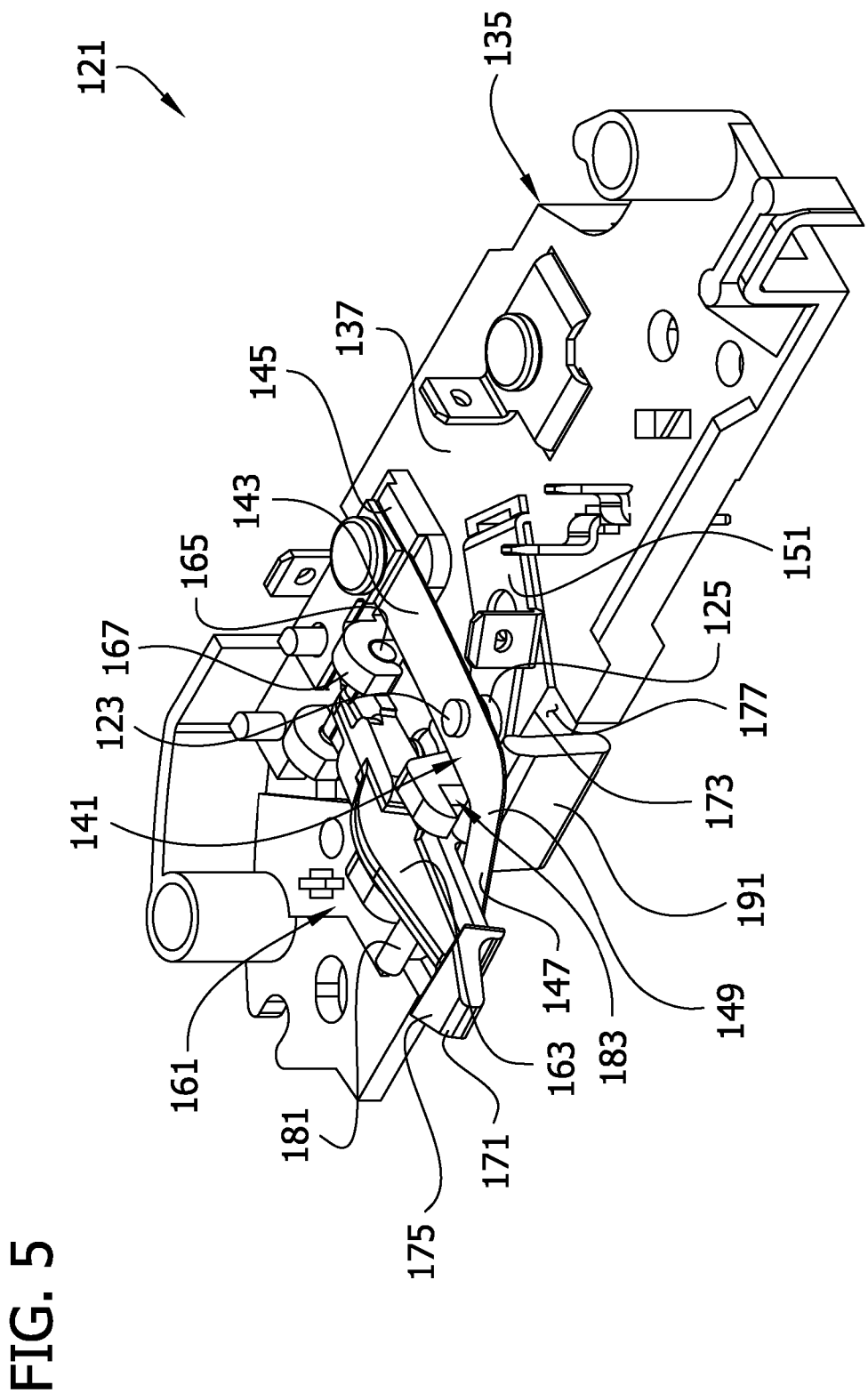
FIGS. 5-7 are a perspective, top plan, and front elevation of the switch, respectively, similar to FIGS. 2-4 except the switch is shown in the closed position.
Figure 6:
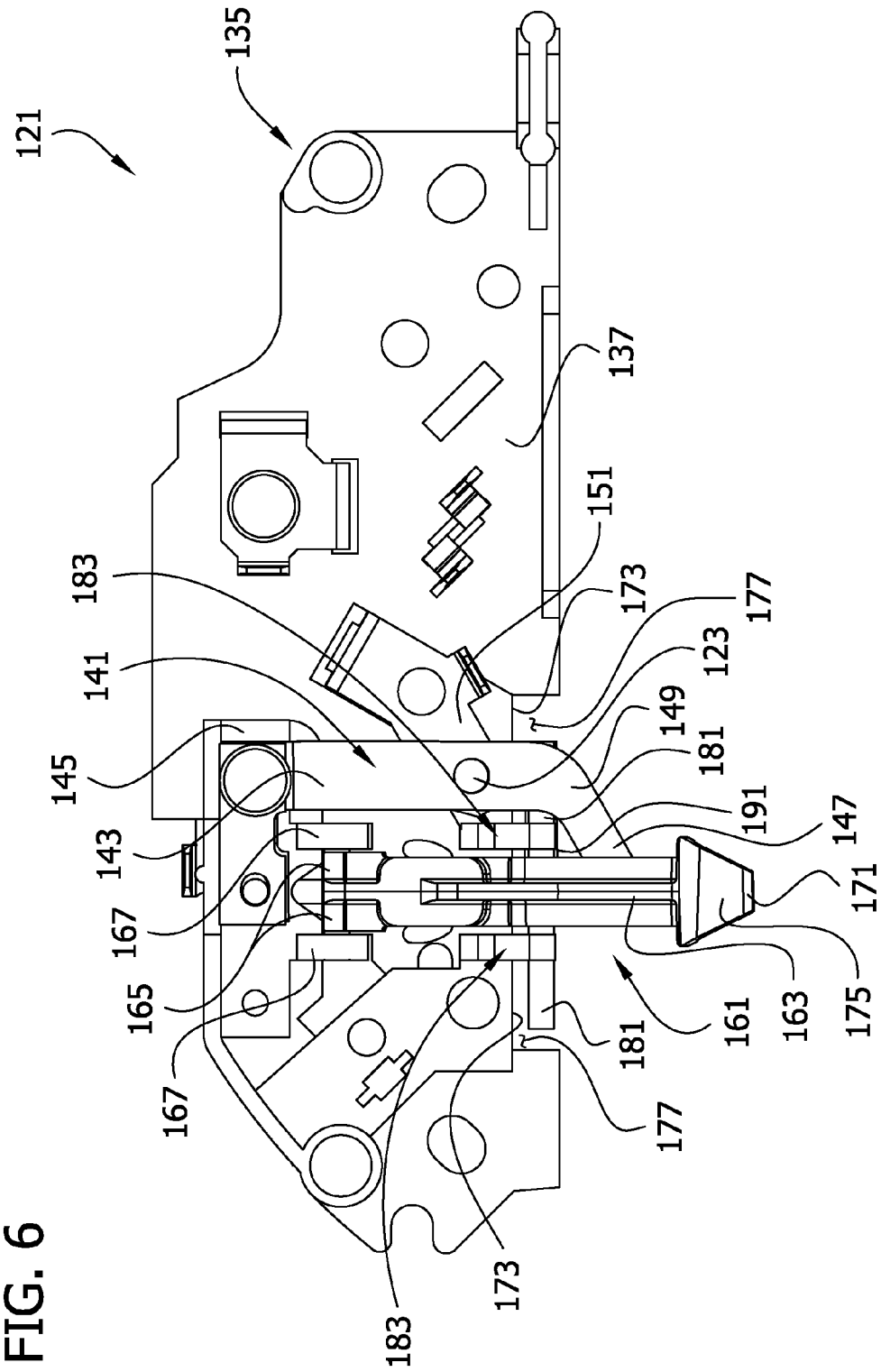
Figure 7:
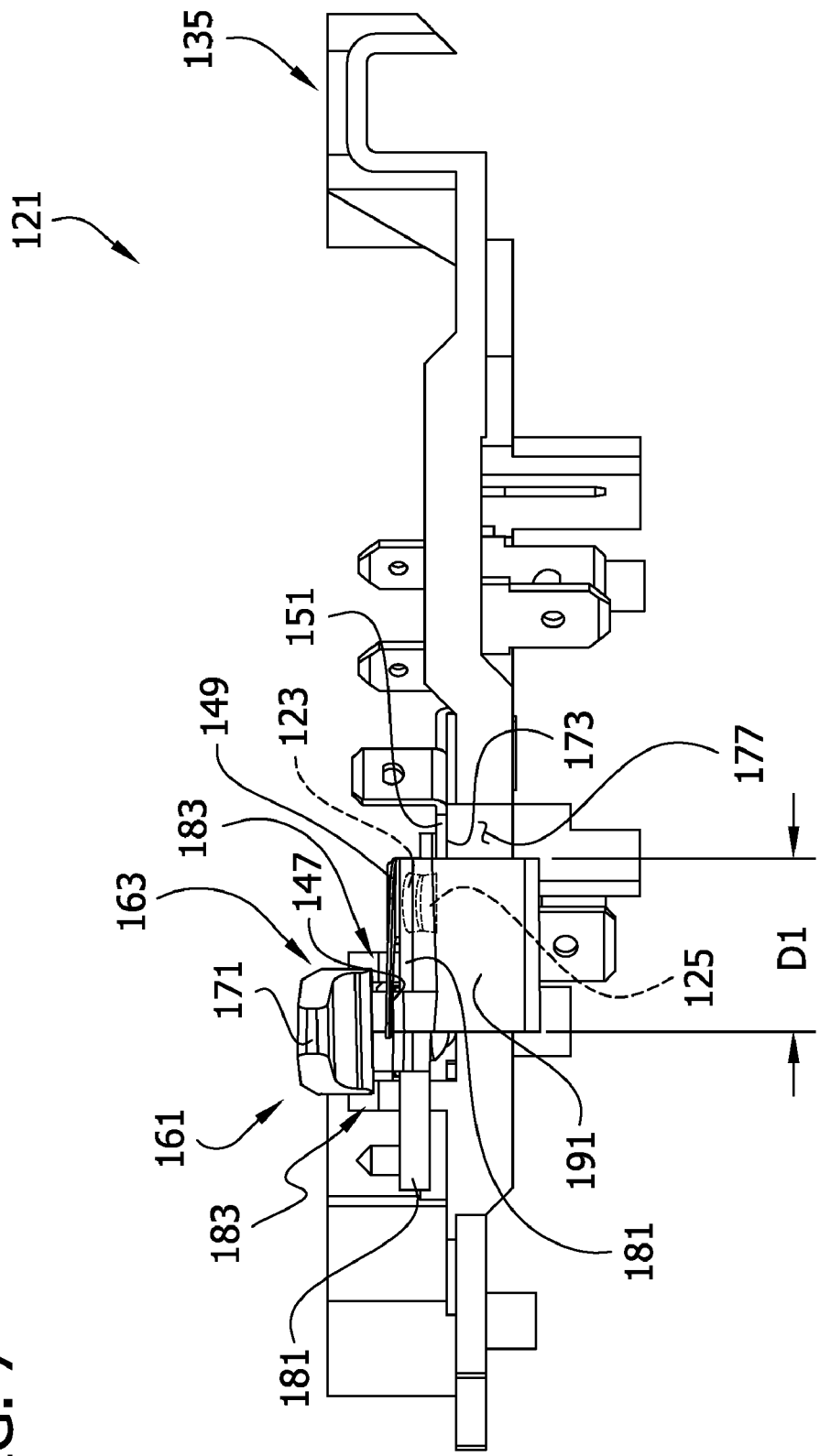

The switch 121 includes a switch arm 161 operable to move the contact 123 on the spring plate 141 relative to the contact 125 on the terminal board platform 137 between the open and closed positions. As illustrated in FIGS. 2-7, the switch arm 161 includes a lever 163 and is mounted for pivoting movement relative to the terminal board 135 between an open position (FIGS. 2-4) and a closed position (FIGS. 5-7). For instance, generally cylindrical mounting posts 165 suitably extend from opposite sides of one end of the lever 163. The mounting posts 165 are retained in position adjacent the terminal board platform 137 by one or more retainers 167 allowing rotation of the switch arm 161 on a pivot axis that is coaxial with the mounting posts 165. As illustrated in FIGS. 1, 2 and 5, for example, the retainers 167 are suitably hooks extending from the terminal board platform 137 so each of the hooks extends around and holds a respective one of the mounting posts 165 adjacent the platform. Those skilled in the art will recognize there are various ways to mount a switch arm for movement between open and closed positions within the scope of the invention.

Figure 3:
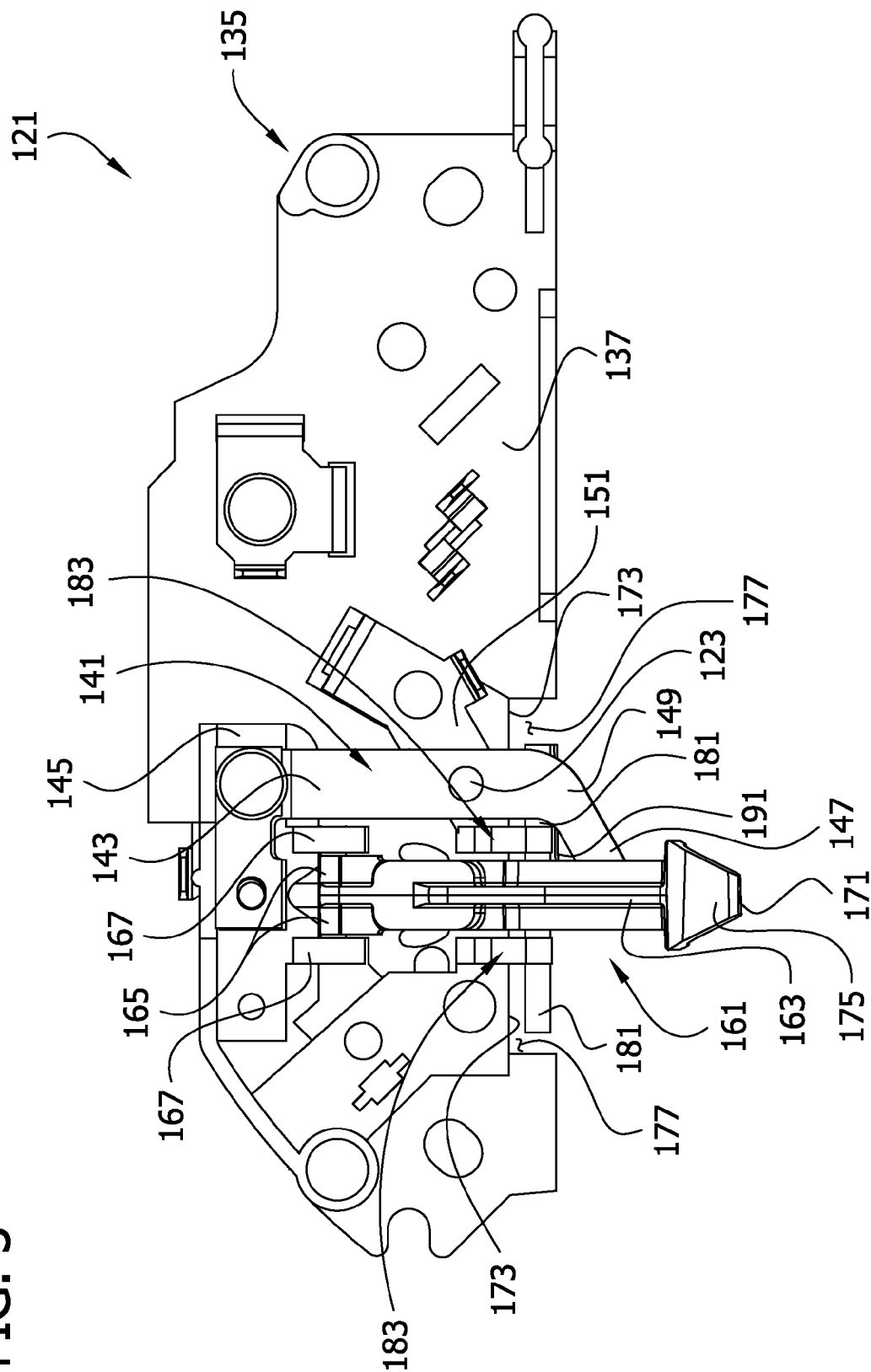
FIG. 3 is a top plan view of the switch.

As illustrated in FIGS. 2-7, the lever 163 extends from the axis defined by the mounting posts 165 to a free end 171 having a relatively smooth flat bearing surface 175 for reasons that will become apparent. Referring to FIGS. 3 and 6, the primary segment 143 of the spring plate 141 is offset from and extends generally parallel to the switch arm lever 163. The end segment 147 of the spring plate 141 is angled to extend from the bend 149 in the spring plate 141 to a position under the lever 163 of the switch arm 161, as illustrated in FIG. 4. The switch arm 161 is rotatable about the mounting posts 165 to move the spring plate 141 and the contact 123 mounted thereon to the closed position. For example, a downward force F (FIG. 4) can be applied to the free end 171 of the lever 163 to rotate the switch arm 161 against the biasing force of the spring plate 141 to bend the spring plate until the electrical contacts 123, 125 engage one another and close the switch 121. In the closed position (FIGS. 5-7), there is a relatively low resistance to flow of electric current between the contacts 123, 125. Thus, electrical current can flow readily between the contacts 123, 125 when the switch 121 is closed and energized by the power supply.

Figure 9:
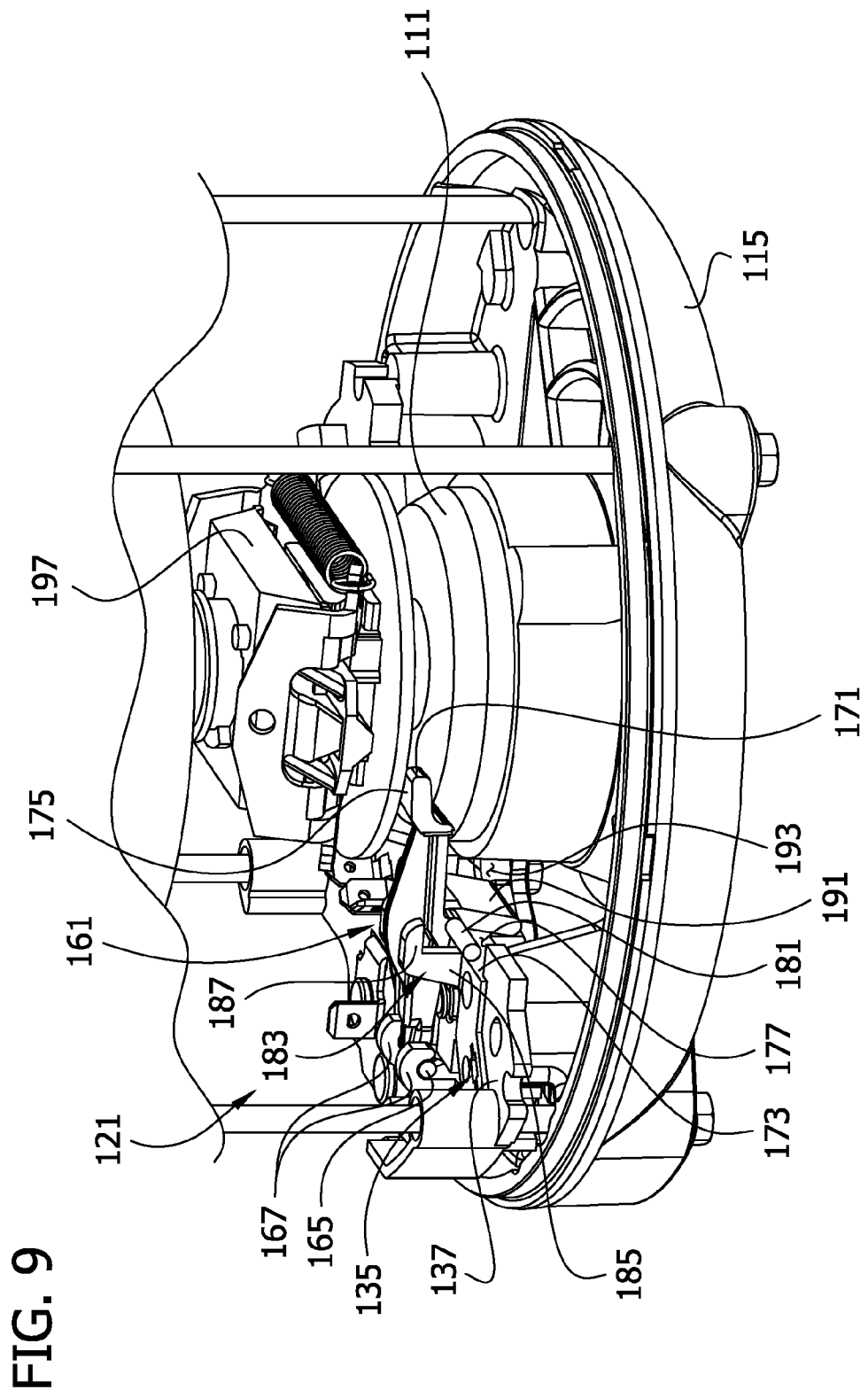
FIG. 9 is an enlarged perspective of a portion of the motor similar to FIG. 1 showing the position of the start winding switch and a centrifugal actuator when the motor is operating at less than a threshold speed.
Figure 10:
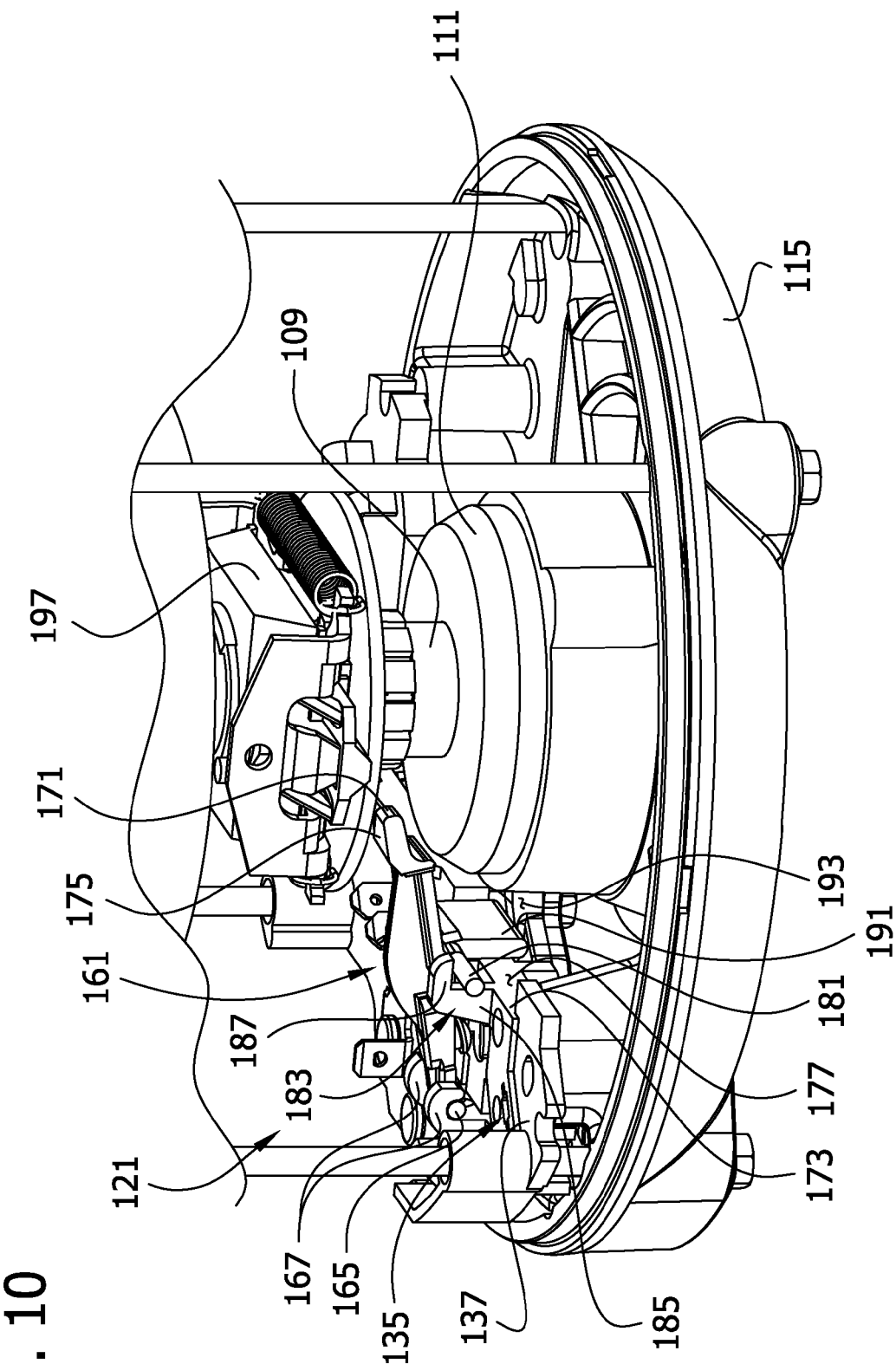
FIG. 10 is an enlarged perspective similar to FIG. 9 showing the position of the start winding switch and centrifugal actuator when the motor is operating at full speed.

When the switch arm 161 is in the closed position, the biasing force of the spring plate 141 tends to pivot the switch arm 161 about the mounting posts 165 toward the open position. The spring plate 141 may also bias the switch arm 161 to continue moving along the path from the closed position to the open position when the switch arm is in the open position. The switch arm 161 has a pair of stops 181 extending from opposite sides of the lever 137. The stops 181 are positioned axially on the lever 163 between the mounting posts 165 and the free end 171 of the lever. A pair of retainers 183 is secured to the terminal board platform 137 and positioned to engage a respective one of the stops 181 to limit the amount by which the switch arm 161 can be rotated (e.g., by the spring plate 141, gravity, or any other forces) away from the closed position. As illustrated in FIGS. 1, and 9-10, for instance, the retainers 183 are suitably hooks, each having a base 185 secured to the terminal board platform 137 and an end 187 positioned to obstruct further movement of the stop 181 along its path from the closed position to the open position once the rotation of the switch arm 161 has reached the limit, which can be either at or beyond the open position within the scope of the invention.

As illustrated in FIG. 6, when the switch arm 161 is in the closed position, an edge margin 173 of the terminal board platform 137 is positioned axially along the lever 137 between the free end 171 and the mounting posts 165. The edge margin 173 suitably forms the base of a notch 177 extending laterally into a side of the terminal board platform 137. The retaining arms 181 on the lever 163 are positioned in or above the notch 177 just beyond the edge margin 173 of the platform 137 so the edge margin is positioned axially along the lever 163 between the retaining arms and the mounting posts 165 when the switch arm 161 is in the closed position. The retainers 183 that engage the stops 181 are suitably secured to the board at the edge margin 173. As illustrated in FIGS. 1 and 9-10, for example, the base 185 of each hook 183 is secured to the platform 137 adjacent the edge margin and the ends 167 of the hooks extend laterally beyond the edge margin to a position above the notch 177. The contacts 123, 125 are also adjacent the edge margin when the switch 121 is closed. In particular, the contact 125 on the upper surface of the platform 137 is suitably spaced no more than about 0.1 inches from the edge margin.

The switch arm includes an arc barrier 191 that is formed integrally with the lever 163. As illustrated in FIGS. 2-7, the arc barrier 191 extends from one of the stops 181 down along the edge margin 173 of the mounting terminal platform 137. As illustrated in FIGS. 4 and 7, for instance, the arc barrier is suitably configured to extend along the edge margin 173 of the terminal board platform 137 in a direction substantially parallel to the edge margin a distance D1, which is suitably in the range of about 0.25 inches to about 1 inch (e.g., in the range of about 0.5 inches to about 0.6 inches). As illustrated, the arc barrier 191 is in the form of a wall (e.g., a substantially rectangular wall) extending down from the stop 181 to a position under the terminal board 135.

The entire switch arm 161 is suitably formed as one unitary body. For example, the switch arm 161 can be molded as one-piece (e.g., in an injection molding process) from an electrically non-conductive material, such as a glass-filled polyester or other polymeric material. Likewise, the terminal board 135, including the terminal board platform 137, retainers 167, and retainers 183, can suitably be a unitary body molded as one-piece (e.g., in an injection molding process) from a suitable electrically non-conductive material.

Figure 8:
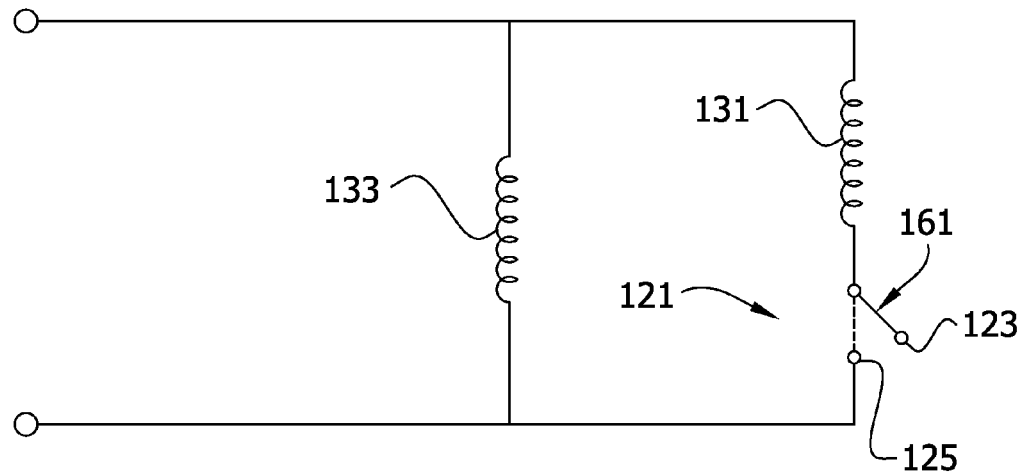
FIG. 8 is a simplified schematic circuit diagram illustrating connection of the switch to other components of the motor of FIG. 1.

Operation of the motor 101 will now be discussed with reference to FIGS. 8-10. As illustrated schematically in FIG. 8, the motor 101 includes main windings 133 on the stator 103. When the main windings 133 are energized by a power supply (not shown) they produce in conjunction with the stator 103 a rotating magnetic field that rotates the rotor and shaft 109 in a manner well known to those skilled in the art. The motor 101 also includes auxiliary start windings 131 on the stator 103 to facilitate starting the motor when it is turned on. As in known to those skilled in the art, the auxiliary windings 131 help produce additional torque when the rotor is idle or operating at low speed. The circuit illustrated in FIG. 8 may include a capacitor (not shown) or other component (e.g., in series with the auxiliary windings 131) to produce a phase shift between the current flowing through the main windings 133 and the current flowing through the auxiliary windings 131.

The switch 121 is connected in series to the auxiliary windings 131. The switch 121 and auxiliary windings 131 are connected in parallel to the main windings 133. Accordingly, when the switch 121 is closed (as indicated by the broken line in FIG. 8), the auxiliary windings 131 are energized when the main windings 133 are connected to the power supply. On the other hand, when the switch 121 is open (as represented by the solid line in FIG. 8), the auxiliary start windings 131 are disconnected from the power supply, but the main windings 133 can still be energized by the power supply to keep the motor 101 running.

As illustrated in FIGS. 9 and 10, the switch 121 is suitably actuated by a centrifugal actuator 197. When the motor 101 is idle or still operating at low speed after being turned on, the centrifugal actuator 197 is positioned relative to the switch arm so the centrifugal actuator holds the switch arm 161 in the closed position. Thus, when the motor 101 is off, the centrifugal actuator 197 holds the switch 121 in the closed position. When the motor 101 is turned on, the power is supplied to the main windings 133 and auxiliary windings 131. The torque produced by the windings 131, 133 causes the rotor, shaft 109, and centrifugal actuator 197 to rotate relative to the switch 121 and motor end shield 115. The rotating centrifugal actuator 197 slides on the bearing surface 175 at the free end 171 of the switch arm lever 163 and holds the switch arm 161 in the closed position against the biasing force of the spring plate 141.

The centrifugal actuator 197 is constructed so it moves along the axis of the shaft 109 when the shaft reaches a threshold angular velocity. In particular, upon reaching a threshold angular velocity, the centrifugal actuator 197 moves away from the end shield 115 and the free end 171 at the end of the switch arm lever 163. Centrifugal actuators that operate in this manner are well known to those skilled in the art so further details about the construction of the centrifugal actuator will not be provided. When the force applied by the centrifugal actuator 197 to the lever 163 to hold the switch 121 in the closed position is removed, the biasing force of the spring plate 141 moves the contacts 123, 125 and switch arm 161 to the open position.

Upon opening of the switch 121 by movement of the centrifugal actuator, the auxiliary windings 131 are de-energized and the motor 101 operates on the main windings 133. If the circuit includes a capacitor in series with the auxiliary windings 131, the capacitor is also disconnected from the power supply upon opening of the switch 121. At all times during operation of the motor, the arc barrier is positioned in a gap 193 between the switch contacts 123, 125 and at least one of the bearing hub 111 on the motor end shield 115 and the shaft 109. For example, as illustrated in FIG. 9, the arc barrier 191 is between the positioned generally between the switch contacts 123, 125 on one side of the arc barrier and the shaft 109 and bearing hub 111 on the opposite side of the arc barrier. Thus, the arc barrier 191 shields the shaft 109 and bearing hub 111 from any electrical arcing associated with the switch contacts 123, 125.

Because the arc barrier 191 is formed integrally with the lever 163 of the switch arm 161, the arc barrier is automatically installed in position to shield the shaft 109 and bearing hub 111 when the switch arm is installed. Further, if the arc barrier 191 is inadvertently omitted from the assembly or dislodged from its proper position, the motor 101 will not start properly because the switch 121 will remain in the open position and fail to properly energize the start windings 131 in view of the fact the entire switch arm 161 is omitted or improperly installed and the switch contacts 123, 125 are biased to the open position by the spring plate 141. Accordingly, those using the motor 101 are less likely to experience electrical arcing associated with the switch without first noticing warning signs that something is wrong. In some instances, it may be impossible to start the motor 101 without the start windings 131 in which case attempts to operate the motor without the arc barrier 191 will be futile.

Although the switch 121 is described and illustrated above is a start winding switch, it is understood that a switch as described herein can be used to perform different functions in addition to and/or instead of controlling operation of start windings without departing from the scope of the invention. For example, the switch 121 is suitable for with a centrifugal actuator as part of a "proof of rotation" type circuit that provides a signal or other indication that the motor has started and reached a threshold speed.

When introducing elements of the present invention or the preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A start winding switch for an electric induction motor, the switch comprising:
    a terminal board comprising an electrically non-conductive material and having an edge margin;
    a first electrical contact mounted on the terminal board;
    a switch arm moveably connected to the terminal board for movement with respect to the board, the switch arm comprising a lever extending laterally beyond the edge margin of the board and an electrical arc barrier extending from the lever; and
    a second electrical contact connected to the switch arm;
    the switch arm and said second contact being moveable simultaneously relative to the terminal board and said first contact between an open position, in which an electrical resistance between the first and second contacts is relatively higher, and a closed position, in which the electrical resistance between the first and second contacts is relatively lower and the barrier is positioned adjacent the edge margin of the board and the second contact.

2. A start winding switch as recited in claim 1 wherein the arc barrier comprises a wall positioned to extend along a segment of the edge margin of the board when the switch arm is in the closed position.

3. A start winding switch as recited in claim 1 further comprising a spring plate mounted on the board, the first contact being mounted on the spring plate, the spring plate being biased when the switch arm is in the closed position to move the first contact toward the open position.

4. A start winding switch as recited in claim 3 wherein the spring plate comprises a first segment that is offset from the lever and a second segment connected to the first segment at a bend, the second segment of the spring plate contacting the lever.

5. A start winding switch as recited in claim 1 wherein the switch arm is mounted on the board for pivoting movement between the open and closed positions.

6. A start winding switch as recited in claim 5 wherein:
    the switch arm comprises a pair of stops extending from opposite sides of the lever;
    the switch further comprises a pair of retainers connected to the board, each retainer being positioned to engage a respective one of the stops to limit movement of the switch arm away from the closed position; and
    the arc barrier extends from one of the stops.

7. A start winding switch as recited in claim 1 wherein the switch arm comprises a unitary body.

8. A start winding switch as recited in claim 7 wherein the unitary body is made of a moldable material.

9. An electric motor comprising:
    a stator;
    an end shield secured to the stator;
    a rotor mounted for rotation relative to the stator;
    a shaft connected to the rotor for rotation with the rotor;
    a bearing hub supported by the end shield and supporting the shaft for rotation relative to the end shield;
    windings operable to produce rotation of the rotor relative to the stator when the windings are connected to a power supply;
    a switch comprising first and second electrical contacts and a switch arm, the switch arm comprising:
        (a) a lever operable to move the contacts relative to one another between an open position, in which an electrical resistance between the first and second contacts is relatively higher, and a closed position, in which the electrical resistance between the first and second contacts is relatively lower; and
        (b) an arc barrier formed integrally with the lever, wherein the arc barrier is positioned generally between said first and second contacts and at least one of the shaft and the bearing hub when said first and second contacts are in the closed position.

10. An electric motor as set forth in claim 9 wherein the arc barrier is positioned between the bearing hub and said first and second contacts when the contacts are in the closed position.

11. An electric motor as set forth in claim 9 wherein the motor is an electric induction motor.

12. An electric motor as set forth in claim 9 further comprising a centrifugal actuator mounted on the shaft and moveable relative to the switch arm when the shaft attains a threshold angular velocity to move the contacts between the open and closed positions.

13. An electric motor as set forth in claim 9 wherein:
    the windings include main windings and auxiliary start windings; and
    the switch is operable to de-energize the auxiliary start windings when the shaft attains a threshold angular velocity.

* * * * *